United States Patent
Ogawa et al.

(10) Patent No.: US 10,216,169 B2
(45) Date of Patent: Feb. 26, 2019

(54) AUTOMATIC PARAMETER ADJUSTMENT DEVICE FOR ADJUSTING PARAMETER CORRESPONDING TO PROCESSING CONDITION

(71) Applicant: FANUC Corporation, Yamanashi (JP)

(72) Inventors: Hajime Ogawa, Yamanashi (JP); Junichi Tezuka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 335 days.

(21) Appl. No.: 14/993,254

(22) Filed: Jan. 12, 2016

(65) Prior Publication Data

US 2016/0202688 A1   Jul. 14, 2016

(30) Foreign Application Priority Data

Jan. 13, 2015   (JP) ................................. 2015-004392

(51) Int. Cl.
*G05B 19/40*      (2006.01)
*G05B 19/404*     (2006.01)
(Continued)

(52) U.S. Cl.
CPC ......... *G05B 19/404* (2013.01); *G05B 13/024* (2013.01); *G05B 19/19* (2013.01);
(Continued)

(58) Field of Classification Search
None
See application file for complete search history.

(56) References Cited

U.S. PATENT DOCUMENTS 5,256,951 A * 10/1993 Nashiki .............. G05B 19/4163
                                                        318/575
5,513,114 A *  4/1996 Matsumoto .......... G05B 19/404
                                                        318/626
(Continued)

FOREIGN PATENT DOCUMENTS

CN         104076733 A  * 10/2014
CN         104076733 A    10/2014
(Continued)

*Primary Examiner* — Jason Lin
(74) *Attorney, Agent, or Firm* — Hauptman Ham, LLP (57) ABSTRACT

An automatic parameter adjustment device capable of quantitatively determine the degree of importance of a processing time and a processing accuracy, and effectively adjusting a parameter in accordance with a processing condition. The adjustment device includes: a parameter changing part which changes a control parameter; a test program executing part which transmits a test program to a numerical controller for executing the test program; an execution result obtaining part which obtains an execution result of the test program; a storing part which stores the execution result and the parameter corresponding thereto; a weighting part which determines weighting coefficients of the processing time and processing accuracy as evaluation criteria based on input or setting by an operator; and a parameter extracting part which evaluates the execution result based on the weighted evaluation criteria, and extracts an optimum parameter from the storing part based on the evaluated execution result.

8 Claims, 4 Drawing Sheets

(51) Int. Cl.
  *G05B 13/02* (2006.01)
  *G05B 19/19* (2006.01)
(52) U.S. Cl.
  CPC ........... *G05B 2219/32053* (2013.01); *G05B 2219/42128* (2013.01); *G05B 2219/49065* (2013.01); *G05B 2219/49067* (2013.01)

(56) References Cited

U.S. PATENT DOCUMENTS

| | | | | |
|---|---|---|---|---|
| 5,819,202 | A | * | 10/1998 | Sato .................. G05B 19/4061 408/10 |
| 2003/0018400 | A1 | | 1/2003 | Tuttle et al. |
| 2012/0283851 | A1 | * | 11/2012 | Yamamoto ............ G05B 19/19 700/56 |
| 2014/0129024 | A1 | * | 5/2014 | Lee ..................... G05B 19/404 700/186 |

FOREIGN PATENT DOCUMENTS

| | | |
|---|---|---|
| DE | 102004029790 A1 | 1/2006 |
| JP | 4-302306 A | 10/1992 |
| JP | H07-319506 A | 12/1995 |
| JP | 11-102211 A | 4/1999 |
| JP | 11-134013 A | 5/1999 |
| JP | 2004-116351 A | 4/2004 |
| JP | 2007-34781 A | 2/2007 |
| JP | 2009-122779 A | 6/2009 |
| JP | 2012-243152 A | 12/2012 |
| WO | 2011/077791 A1 | 6/2011 |

* cited by examiner

AUTOMATIC PARAMETER ADJUSTMENT DEVICE FOR ADJUSTING PARAMETER CORRESPONDING TO PROCESSING CONDITION

RELATED APPLICATIONS

The present application claims priority to Japanese Application Number 2015-004392, filed Jan. 13, 2015, the disclosure of which is hereby incorporated by reference herein in its entirety.

BACKGROUND OF THE INVENTION

1. Field of the Invention

The preset invention relates to an automatic parameter adjustment device having a function for adjusting a parameter corresponding to a processing condition of a machine tool.

2. Description of the Related Art

In the prior art, when controlling a machine tool, an automatic parameter adjustment device may be used for automatically adjusting a control gain or an acceleration/deceleration parameter. For example, JP H07-319506 A discloses an auto-tuning controller having a means for automatically adjusting a control parameter so that a measured cycle time is equal to a desired time. Further, JP H07-319506 A describes that the controller may have a rough adjustment mode and a fine adjustment mode, and the optimum mode may be selected depending on a status of an object to be controlled, etc.

In a machine tool, it is necessary to appropriately adjust the parameter of the acceleration/deceleration or the control gain of each drive axis of the machine tool, depending on the application or the shape of a workpiece to be processed. For example, the optimum value for each parameter is different, between when a cycle time (or a processing time) is more important than processing accuracy, and when the processing accuracy is more important than the cycle time to the contrary. In the conventional automatic parameter adjustment device, it is possible to adjust the control gain up to a limit gain so as to not generate an oscillation phenomenon or it is possible to determine the acceleration/deceleration parameter in which the processing time is minimized, whereas it is difficult to adjust the parameter in accordance with an actual processing condition.

For example, when an acceleration/deceleration time constant is increased in order to reduce the processing time, overshoot may occur at an inversion portion of the drive axis of the machine tool (i.e., a curved portion or a discontinuous portion on a program path), whereby the processing accuracy may be deteriorated. On the other hand, if the acceleration/deceleration time constant is sufficiently large, followability to a command may be improved at the inversion portion of the drive axis, whereby the processing accuracy can be improved. However, the processing time is extended in this case. As such, it is difficult to balance the processing time and the processing accuracy, and it is desirable to automatically adjust the parameter suitable for each processing condition.

In the auto-tuning controller disclosed in JP H07-319506 A, the rough adjustment mode and the fine adjustment mode can be alternatively used. However, it is difficult to equally weight the processing time and the processing accuracy, or quantitatively determine the degree of importance (for example, the processing time may be negligible, or the processing accuracy may be slightly more important than the processing time, etc.) when either the processing time or the processing accuracy is more important than the other.

SUMMARY OF THE INVENTION

Therefore, an object of the present invention is to provide an automatic parameter adjustment device capable of quantitatively determine the degree of importance of the processing time and the processing accuracy, and effectively adjusting the parameter in accordance with the processing condition.

According to the present invention, there is provided an automatic parameter adjustment device for automatically adjusting a control parameter of each of at least one drive axis of a machine tool, the control parameter being set to a numerical controller for controlling the machine tool, the automatic parameter adjustment device comprising: a weighting part which determines weighting coefficients of a processing time and a processing accuracy of the machine tool, as evaluation criteria for automatically adjusting the control parameter; a parameter changing part which changes the control parameter; a test program executing part which transmits a test program used in automatically adjusting the control parameter to the numerical controller for executing the test program by the numerical controller; an execution result obtaining part which obtains an execution result by executing the test program, the execution result including a commanded trajectory and an actual trajectory of a representative point of the machine tool and an execution time of the test program; a storing part which stores the execution result and a control parameter corresponding to the execution result; and a parameter extracting part which evaluates the execution result based on the two weighted evaluation criteria, and extracts an optimum control parameter based on the evaluated execution result, wherein the test program is executed multiple times while changing the control parameter, and the extracted control parameter corresponds to an execution result having a high evaluation among a plurality of execution results obtained by executing the test program multiple times.

In a preferred embodiment, the parameter extracting part evaluates the execution result of the test program, based on an evaluation value calculated by: normalizing the execution time of the test program and normalizing an integration value of an absolute value of a trajectory error corresponding to a difference between the commanded trajectory and the actual trajectory; and adding a product of the normalized execution time and the weighting coefficient of the processing time determined by the weighting part to a product of the normalized integration value and the weighting coefficient of the processing accuracy determined by the weighting part.

In a preferred embodiment, the execution result obtaining part obtains the execution result of a specified portion of the test program.

In a preferred embodiment, the storing part has a function for generating or outputting a report including detailed information regarding the automatic adjustment of the control parameter.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTIONS

Figure 1:
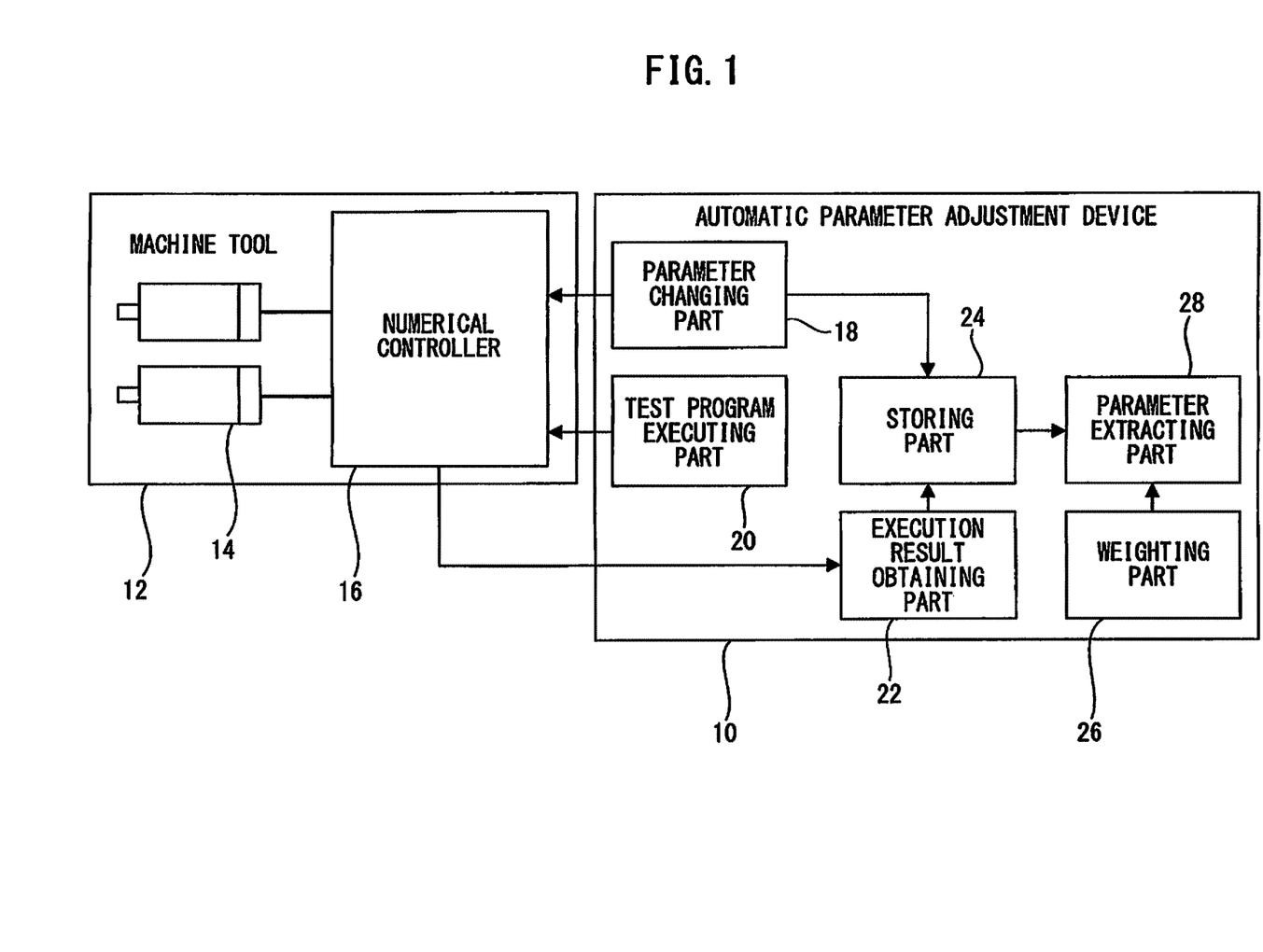
FIG. 1 is a functional block diagram showing an automatic parameter adjustment device according to the present invention, along with a machine tool and a numerical controller.

FIG. 1 is a functional block diagram showing an automatic parameter adjustment device according to an embodiment of the present invention. Automatic parameter adjustment device 10 is used with a numerical controller (NC) 16 which controls at least one drive axis 14 of a machine tool 12. Numerical controller 16 controls has a function for generating a movement command (or a position command) for each drive axis 14 based on a predetermined command given from an NC program, etc., by using a control parameter such as a control gain and/or an acceleration/deceleration time constant.

Automatic parameter adjustment device 10 is used with numerical controller 16 and is configured to automatically adjust of the control parameter. Automatic parameter adjustment device 10 includes: a parameter changing part 18 which changes a control parameter used to control each drive axis 14 by numerical controller 16; a test program executing part 20 which transmits a test program used in automatically adjusting the control parameter to the controller for executing the test program by numerical controller 16; an execution result obtaining part 22 which obtains an execution result by executing the test program, the execution result including a commanded trajectory and an actual trajectory of a representative point (such as a tool center point) of machine tool 12 and an execution time of the test program; a storing part 24 which stores the execution result and a control parameter corresponding to the execution result; a weighting part 26 which determines weighting coefficients of a processing time and a processing accuracy of machine tool 12, as evaluation criteria for automatically adjusting the control parameter; and a parameter extracting part 28 which evaluates the execution result based on the two weighted evaluation criteria, and extracts an optimum control parameter from storing part 24 based on the evaluated execution result.

In the above embodiment, automatic parameter adjustment device 10 is illustrated and explained as a device separated from numerical controller 16. However, a device having a function equivalent to automatic parameter adjustment device 10 may be integrally positioned in numerical controller 16, and such a configuration is also within a scope of the present invention.

Figure 2:
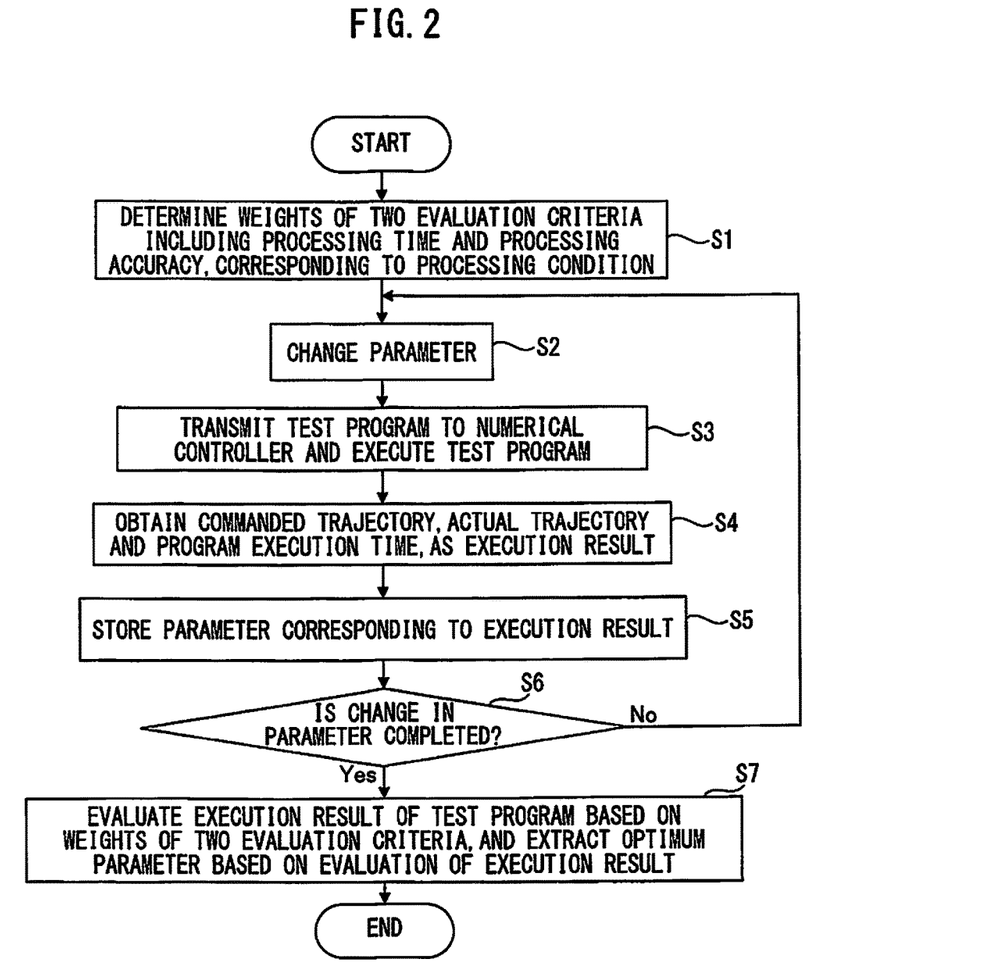
FIG. 2 is a flowchart showing an example of the procedure using the automatic parameter adjustment device of FIG. 1.
Figure 3:
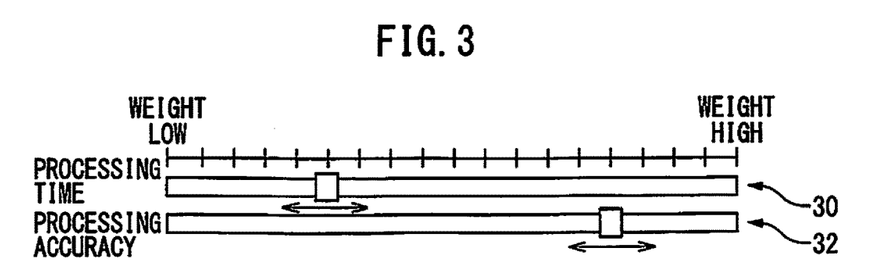
FIG. 3 shows an example of a means to determine a weighting coefficient for each of evaluation criteria.

Hereinafter, an automatic adjustment process using automatic parameter adjustment device 10 will be explained, with reference to a flowchart of FIG. 2. First, in weighting part 26, weighting coefficients for a plurality of (in this case, two) evaluation criteria are determined, corresponding to a processing condition (step S1). Concretely, before starting the automatic adjustment of the parameter, an operator weights the evaluation criteria for evaluating the control parameter corresponding to the processing condition. FIG. 3 shows an example an image capable of being operated and displayed on automatic parameter adjustment device 10, etc., when automatically adjusting the parameter. In this example, the weighting coefficients of the two evaluation criteria (i.e., the processing time and the processing accuracy) can be adjusted by adjustment bars 30 and 32, respectively. Alternatively, the weighting coefficients may be changed by using a text box or spin control, etc.

In the next step S2, in parameter changing part 18, the control parameter to be automatically adjusted is changed. For example, the control parameter may be changed by increasing or decreasing the parameter by an appropriate increment or decrement, within a predetermined changing range (between upper and lower limits). In this case, the upper and lower limits and/or the increment/decrement may be previously determined, or may be set by the operator using a proper input means or the like before the automatic adjustment of the parameter.

In the next step S3, test program executing part 20 transmits the test program to numerical controller 16, and the test program is executed by numerical controller 16. Since the present invention is intended to automatically adjust the control parameter corresponding to the processing condition, it is preferable to use a practically usable processing program be used as the test program. However, another program, previously prepared for adjusting the parameter, may be used as the test program.

In the next step S4, execution result obtaining part 22 obtains the execution result of the test program, i.e., a commanded trajectory and an actual trajectory of an object to be controlled (such as the tool center point) and an execution time of the program, which are obtained from numerical controller 16 when the test program has been executed. In this regard, the commanded trajectory and the actual trajectory can be calculated from a position command or a position feedback of each drive axis for controlling the object to be controlled, and from information regarding a mechanical structure of the machine tool. In addition, the program execution time can be calculated from a period of time from starting to terminating of the test program.

In the next step S5, storing part 24 stores an execution result of the test program, and a parameter corresponding to the executed test program. Then, in step S6, it is judged as to whether or not the parameter is changed within the parameter changing range as described above. If the change in parameter is completed, the procedure progresses to step S7. On the other hand, if the change in parameter within the changing range is not completed, steps S2 to S5 are repeated.

As explained above, after the parameter is changed within the parameter changing range and the execution result of the test program with respect to each parameter is obtained, an optimum parameter $x_p$ corresponding to the processing condition is extracted in step S7. A preferred example thereof will be explained below.

From commanded trajectory $Pc(k \cdot \Delta t)$ and actual trajectory $Pf(k \cdot \Delta t)$ of the representative point (such as the tool center point) of the machine tool, a difference between the trajectories (or a trajectory error $ERR(k \cdot \Delta t)$) is calculated. This trajectory error may be useful data for evaluating the processing accuracy. Next, as shown in equation (1), absolute values of trajectory error $ERR(k \cdot \Delta t)$ with respect to parameter values x are integrated so as to calculate an integration value $ERRs(x)$.

$$ERRs(x) = \sum_{k=1}^{a} |ERR(k \cdot \Delta t)| \qquad (1)$$

Figure 4:
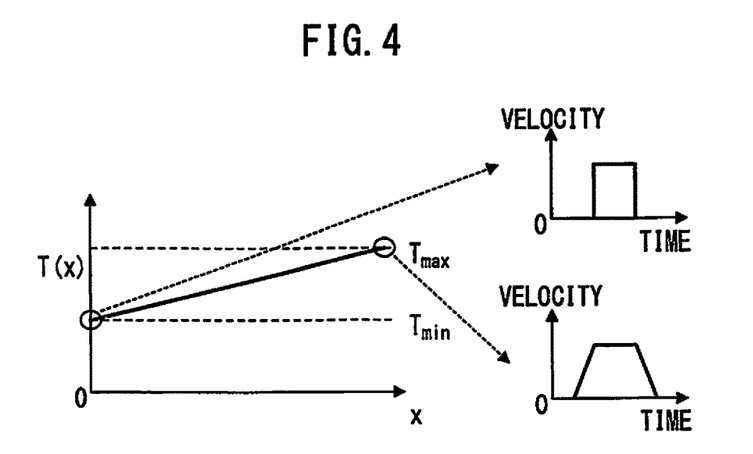
FIG. 4 is a graph showing a change in a program execution time when an acceleration/deceleration time constant is varied as a control parameter.

From program execution time T(x) with respect to parameter values x and integration value ERRs(x) of the absolute values of the trajectory errors, the minimum value and the maximum value of each data are calculated. FIG. 4 shows a graph as an example thereof, in which a horizontal axis corresponds to an acceleration/deceleration time constant x, and a vertical axis corresponds to program execution time T(x).

In the example of FIG. 4, program execution time T(x) is decreased as acceleration/deceleration time constant x is decreased, and program execution time T(x) is increased as acceleration/deceleration time constant x is increased. Therefore, the program execution time becomes a minimum value $T_{min}$ when acceleration/deceleration time constant x is equal to a lower limit value, and the program execution time becomes a maximum value $T_{max}$ when acceleration/deceleration time constant x is equal to an upper limit value. Similarly, regarding integration value ERRs(x), a minimum value $ERRs_{min}$ and a maximum value $ERRs_{max}$ thereof are calculated.

When a plurality of parameters (for example, parameters x, y and z) should be simultaneously adjusted, the minimum and maximum values are calculated with respect to each of program execution time T(x, y, z) and integration value ERRs(x, y, z). For example, when two parameters x and y are simultaneously adjusted, the graph of FIG. 4 can be illustrated as a three-dimensional graph, and the minimum and maximum values can be calculated from the three-dimensional graph.

Next, with respect to each value of parameter x, program execution time T(x) and integration value ERRs(x) of the absolute values of the trajectory error are normalized as represented by equations (2) and (3), respectively. In this case, normalized values of T(x) ERRs(x) are represented by Tn(x) and ERRn(x), respectively.

$$Tn(x) = \left(1 - \frac{T(x) - T\min}{T\max - T\min}\right) \qquad (2)$$

$$ERRn(x) = \left(1 - \frac{ERRs(x) - ERRs\min}{ERRs\max - ERRs\min}\right) \qquad (3)$$

Next, as represented by equation (4), normalized values Tn(x) and ERRn(x) are multiplied by the respective weighting coefficients determined by weighting part 26, and products obtained by the multiplication are added to each other so as to calculate an evaluation value E(x). In equation (4), the weighting coefficient of the processing time determined by weighting part 26 is represented by "A," and the weighting coefficient of the processing accuracy determined by weighting part 26 is represented by "B." Instead of equation (4), an evaluation value E'(x) as represented by equation (5) may be used, in which the maximum value is equal to one.

$$E(x) = A \cdot Tn(x) + B \cdot ERRn(x) \qquad (4)$$

$$E'(x) = \frac{1}{A+B}(A \cdot Tn(x) + B \cdot ERRn(x)) \qquad (5)$$

In the embodiment, the process (also referred to as process "a") for weighting and normalizing program execution time T(x) and integration value ERRs(x) is explained as the concrete example of step S7. However, the present invention is not limited to this example. For example, following process "b" or "c" may be used.

(Process b)

A sum of squares of two sets of weighted data is calculated, and a square root of the sum (or a vector length) is calculated. The square root (or the vector length) is calculated with respect to each parameter, and the parameter, in which the vector length is the maximum, is determined.

(Process c)

The weighted data (x, y, z) is substituted into an evaluation function V(x, y, z), and the parameter, in which the evaluation value is maximum, is determined. The evaluation function may be obtained experimentally or calculated from a theoretical equation.

Finally, parameter value $x_p$ is calculated, in which evaluation value E(x) or E'(x) obtained by equation (4) or (5) is high (normally, maximum), and value $x_p$ is extracted as an optimum parameter from storing part 24, whereby the procedure of step S7 is completed. Alternatively, depending on another constraint condition, etc., the control parameter not corresponding to the maximum evaluation value (for example, corresponding to the second or third highest evaluation value) may be extracted as the optimum value.

Depending on the motion of the machine tool, a tool may be moved along a corner portion. In such a case, when the tool is moved along a commanded trajectory 34 as exemplified in FIG. 5, an actual trajectory of the tool may include a relatively large trajectory error at the position where drive axis 14 is inverted, due to delay in inversion or overshoot, etc. In this case, it is preferable that the parameter be adjusted by focusing only the data of a specified portion such as a corner portion, etc. Therefore, execution result obtaining part 22 may obtain the commanded trajectory, the actual trajectory and the program execution time regarding only the specified portion such as a corner, an arc, a curve, or an inverting portion in reciprocating motion, etc., in the test program, the specified portion being useful for the automatic adjustment.

Figure 6:
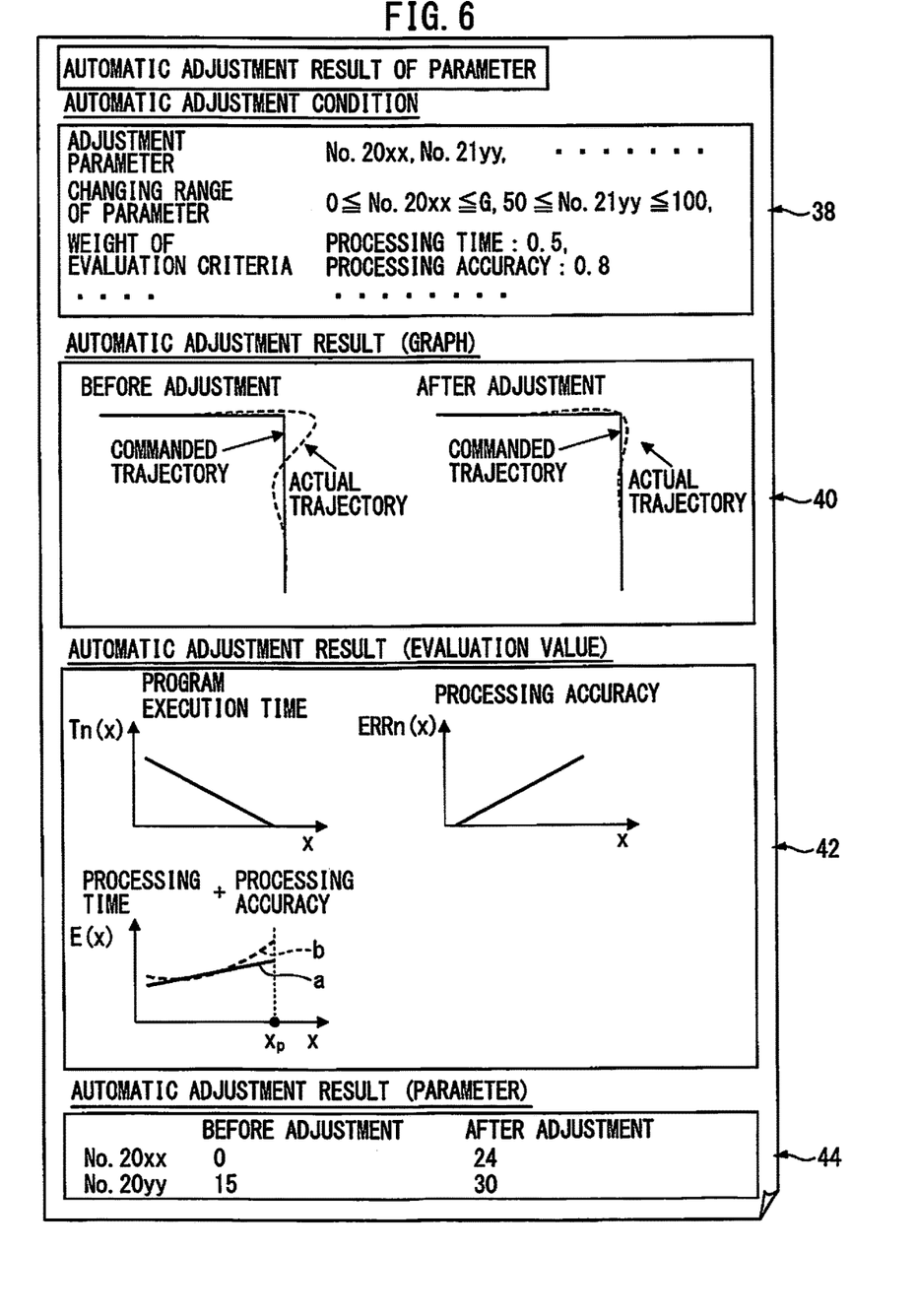
FIG. 6 shows an example of a report which is output as an automatic adjustment result of the parameter.

FIG. 6 shows an example, in which the detail information regarding the automatic adjustment of the control parameter (i.e., the information including an automatic adjustment condition and/or automatic adjustment result (or the difference between before and after changing in parameter)), stored in storing part 24, is generated as an electronic file and output or displayed. In the example of FIG. 6, the "automatic adjustment condition" determined by the operator is described or displayed on a column 38, and the automatic adjustment condition includes a number or sign of the control parameter to be adjusted, the changing range of each parameter, and the weighting coefficients for the processing time and processing accuracy, etc.

Figure 5:
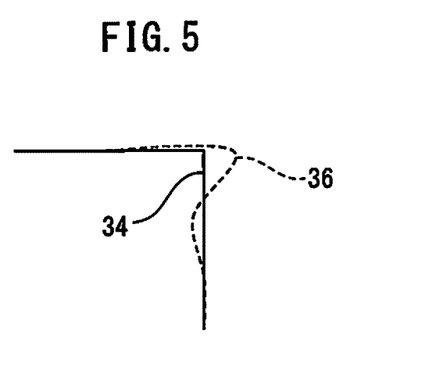
FIG. 5 shows an example of a commanded trajectory and an actual trajectory at a corner portion.

A column 40 visually indicates the automatic adjustment result of the parameter. In the example of FIG. 6, column 40 indicates the commanded trajectory and the actual trajectory at the corner portion as shown in FIG. 5, so that these trajectories can be compared before and after the automatic adjustment.

A column 42 indicates the automatic adjustment result of the parameter as the evaluation value. In the example of FIG. 6, column 42 indicates (three) graphs of program execution time T(x), integration value ERRs(x) of the absolute values of the trajectory error, and evaluation value E(x) based on the weighting coefficients determined in the "automatic adjustment condition," respectively, in which T(x), ERRs(x) and E(x) are calculated by using parameter x as a variable (for example, parameter x is varied by an appropriate increment or decrement between the minimum and maximum values of the changing range as indicated in the "automatic adjustment condition"). Further, the graph of evaluation value E(x) indicates two patterns, which are calculated based on the above process "a" and "b," respectively.

A column 44 indicates a concrete example of a numerical value of the automatically adjusted parameter. In the example of FIG. 6, column 44 indicates the values of the two parameters included in the "automatic adjustment condition" before and after the automatic adjustment.

By generating and/or outputting the report as exemplified in FIG. 6, the operator can monitor the evaluation value based on optimum parameter $x_p$ and/or another parameter, as well as the automatic adjustment result. Therefore, appropriateness or the like of the parameter after being automatically adjusted can be easily inspected.

In the present invention, the processing time and the processing accuracy (mainly evaluated in the actual processing) are determined as the evaluation criteria, and the result of the automatic adjustment of the control parameter is evaluated after weighting the respective evaluation criteria. Therefore, according to the present invention, the parameter can be adjusted in accordance with the processing condition. Further, in the present invention, in comparison to the prior art, the control parameter can be finely adjusted, and workload for finely adjusting the parameter can be reduced.

While the invention has been described with reference to specific embodiments chosen for the purpose of illustration, it should be apparent that numerous modifications could be made thereto, by a person skilled in the art, without departing from the basic concept and scope of the invention.

The invention claimed is:

1. An automatic parameter adjustment device for automatically adjusting a control parameter of each of at least one drive axis of a machine tool, the control parameter being set to a numerical controller for controlling the machine tool, the automatic parameter adjustment device comprising:
a processor configured to
determine a weighting coefficient of a processing time and a weighting coefficient of a processing accuracy of the machine tool, as evaluation criteria for automatically adjusting the control parameter,
change the control parameter,
transmit a test program used in automatically adjusting the control parameter to the numerical controller for executing the test program by the numerical controller,
obtain an execution result of said executing the test program, the execution result including a commanded trajectory and an actual trajectory of a representative point of the machine tool and an execution time of the test program,
store the execution result and a control parameter corresponding to the execution result,
evaluate the execution result based on the two weighted evaluation criteria, and
extract an optimum control parameter based on the evaluated execution result,
wherein the test program is executed multiple times while changing the control parameter, and the extracted control parameter corresponds to an execution result satisfying a predetermined condition among a plurality of execution results obtained by executing the test program multiple times.

2. The automatic parameter adjustment device as set forth in claim 1, wherein
the processor is configured to evaluate the execution result of the test program, based on an evaluation value calculated by:
normalizing the execution time of the test program and normalizing an integration value of an absolute value of a trajectory error corresponding to a difference between the commanded trajectory and the actual trajectory, and
adding a product of the normalized execution time and the determined weighting coefficient of the processing time to a product of the normalized integration value and the determined weighting coefficient of the processing accuracy.

3. The automatic parameter adjustment device as set forth in claim 1, wherein
the processor is configured to obtain the execution result of a specified portion of the test program.

4. The automatic parameter adjustment device as set forth in claim 1, wherein
the processor is configured to generate or output a report including at least one of a condition or a result of the automatic adjustment of the control parameter.

5. An automatic parameter adjustment device for automatically adjusting a control parameter of each of at least one drive axis of a machine tool, the control parameter being set to a numerical controller for controlling the machine tool, the automatic parameter adjustment device being integrated in the numerical controller,
the numerical controller configured to
determine a weighting coefficient of a processing time and a weighting coefficient of a processing accuracy of the machine tool, as evaluation criteria for automatically adjusting the control parameter,
change the control parameter,
execute a test program used in automatically adjusting the control parameter,
obtain an execution result of executing the test program, the execution result including a commanded trajectory and an actual trajectory of a representative point of the machine tool and an execution time of the test program,
store the execution result and a control parameter corresponding to the execution result,
evaluate the execution result based on the two weighted evaluation criteria, and
extract an optimum control parameter based on the evaluated execution result,
wherein the numerical controller is configured to execute the test program multiple times while changing the control parameter, and the extracted control parameter corresponds to an execution result satisfying a predetermined condition among a plurality of execution results obtained by executing the test program multiple times.

6. The automatic parameter adjustment device as set forth in claim 5, wherein
the numerical controller is configured to evaluate the execution result of the test program, based on an evaluation value calculated by:
normalizing the execution time of the test program and normalizing an integration value of an absolute value of a trajectory error corresponding to a difference between the commanded trajectory and the actual trajectory, and adding a product of the normalized execution time and the determined weighting coefficient of the processing time to a product of the normalized integration value and the determined weighting coefficient of the processing accuracy.

7. The automatic parameter adjustment device as set forth in claim 5, wherein the numerical controller is configured to obtain the execution result of a specified portion of the test program.

8. The automatic parameter adjustment device as set forth in claim 5, wherein the numerical controller is configured to generate or output a report including at least one of a condition or a result of the automatic adjustment of the control parameter.

CLAIMS CORRESPONDENCE TABLE

| Claims in U.S. application | Patentable Claims in JP Application | Explanation regarding the correspondence |
|---|---|---|
| 1 | 1 | sufficiently corresponding |
| 2 | 2 | sufficiently corresponding |
| 3 | 3 | sufficiently corresponding |
| 4 | 4 | sufficiently corresponding |
| 5 | 1 | sufficiently corresponding |
| 6 | 2 | sufficiently corresponding |
| 7 | 3 | sufficiently corresponding |
| 8 | 4 | sufficiently corresponding |

* * * * *